(12) United States Patent
Park et al.

(10) Patent No.: US 9,084,020 B2
(45) Date of Patent: Jul. 14, 2015

(54) METHOD AND APPARATUS FOR PROVIDING AND RECEIVING USER INTERFACE

(75) Inventors: Kyung-mo Park, Seoul (KR); Young-sun Ryu, Seongnam-si (KR); Seong-ho Cho, Seoul (KR); Ho-yeon Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 12/423,992

(22) Filed: Apr. 15, 2009

(65) Prior Publication Data

US 2009/0265422 A1 Oct. 22, 2009

Related U.S. Application Data

(60) Provisional application No. 61/045,787, filed on Apr. 17, 2008.

(30) Foreign Application Priority Data

Aug. 12, 2008 (KR) .......... 10-2008-0079033
Sep. 26, 2008 (KR) .......... 10-2008-0094897

(51) Int. Cl.
*G06F 15/16* (2006.01)
*H04N 21/478* (2011.01)
(Continued)

(52) U.S. Cl.
CPC .......... *H04N 21/478* (2013.01); *G06F 9/4445* (2013.01); *G06F 17/30899* (2013.01); *G06F 17/30905* (2013.01); *H04N 21/23412* (2013.01);
(Continued)

(58) Field of Classification Search
CPC .................. G06F 17/30899; G06F 17/30905
USPC ............. 709/227, 203; 715/234, 762; 725/37; 345/204, 853, 744; 370/254; 717/106; 714/38, 742; 710/8
See application file for complete search history.

(56) References Cited

U.S. PATENT DOCUMENTS 6,476,828 B1 * 11/2002 Burkett et al. ............... 715/760
6,751,623 B1 * 6/2004 Basso et al. ..................... 1/1
(Continued)

FOREIGN PATENT DOCUMENTS

AG 10-2005-0072069 7/2005
CN 1770721 5/2006
(Continued)

OTHER PUBLICATIONS

Verhoeven, R.; Dees, W.; , "Defining services for mobile terminals using remote user interfaces," Consumer Electronics, IEEE Transactions on , vol. 50, No. 2, pp. 535-542, May 2004.*
(Continued)

*Primary Examiner* — Imad Hussain
(74) *Attorney, Agent, or Firm* — Staas & Halsey LLP

(57) ABSTRACT

In a method of providing/receiving a user interface between a user interface client and a user interface server, when the user interface server encodes information on a plurality of user interface scenes in a multimedia data format and transmits the encoded information to the user interface client. The user interface client receives and reproduces the multimedia data so that a user interface may be displayed to which a variety of effect are applied considering individual characteristics of the user interface client such as performance of the user interface client and user preference.

53 Claims, 11 Drawing Sheets

(51) Int. Cl.

| | | |
|---|---|---|
| *G06F 17/30* | (2006.01) | |
| *G06F 9/44* | (2006.01) | |
| *H04N 21/234* | (2011.01) | |
| *H04N 21/41* | (2011.01) | |
| *H04N 21/436* | (2011.01) | |
| *H04N 21/44* | (2011.01) | |
| *H04N 21/443* | (2011.01) | |

(52) U.S. Cl.
CPC ..... *H04N 21/4126* (2013.01); *H04N 21/43615* (2013.01); *H04N 21/44012* (2013.01); *H04N 21/4431* (2013.01)

(56) References Cited

U.S. PATENT DOCUMENTS

| | | | | |
|---|---|---|---|---|
| 6,895,430 | B1* | 5/2005 | Schneider | 709/217 |
| 7,197,715 | B1 | 3/2007 | Valeria | |
| 7,346,689 | B1 | 3/2008 | Northcutt et al. | |
| 7,644,367 | B2* | 1/2010 | McKeon et al. | 715/762 |
| 7,827,496 | B2* | 11/2010 | Dorn et al. | 715/746 |
| 2001/0051998 | A1* | 12/2001 | Henderson | 709/217 |
| 2002/0029296 | A1* | 3/2002 | Anuff et al. | 709/311 |
| 2002/0054165 | A1* | 5/2002 | Negishi et al. | 345/853 |
| 2002/0059559 | A1* | 5/2002 | Reddy et al. | 717/109 |
| 2002/0105539 | A1* | 8/2002 | Gamzon et al. | 345/738 |
| 2002/0109718 | A1* | 8/2002 | Mansour et al. | 345/744 |
| 2002/0111995 | A1* | 8/2002 | Mansour et al. | 709/203 |
| 2002/0112058 | A1* | 8/2002 | Weisman et al. | 709/227 |
| 2002/0120679 | A1* | 8/2002 | Hayton et al. | 709/203 |
| 2002/0186664 | A1* | 12/2002 | Gibson et al. | 370/254 |
| 2003/0001897 | A1 | 1/2003 | Meandzija et al. | |
| 2003/0030674 | A1* | 2/2003 | Johnstone et al. | 345/781 |
| 2003/0117365 | A1* | 6/2003 | Shteyn | 345/156 |
| 2003/0151621 | A1* | 8/2003 | McEvilly et al. | 345/744 |
| 2003/0195923 | A1* | 10/2003 | Bloch et al. | 709/203 |
| 2004/0015981 | A1* | 1/2004 | Coker et al. | 719/320 |
| 2004/0148586 | A1* | 7/2004 | Gilboa | 717/108 |
| 2004/0163046 | A1* | 8/2004 | Chu et al. | 715/517 |
| 2004/0193652 | A1* | 9/2004 | Wendker et al. | 707/104.1 |
| 2005/0010877 | A1 | 1/2005 | Udler | |
| 2005/0101312 | A1 | 5/2005 | Kang | |
| 2005/0131911 | A1* | 6/2005 | Chi et al. | 707/100 |
| 2005/0149639 | A1* | 7/2005 | Vrielink et al. | 710/8 |
| 2005/0278793 | A1* | 12/2005 | Raley et al. | 726/28 |
| 2005/0283798 | A1* | 12/2005 | Hunleth et al. | 725/37 |
| 2006/0041641 | A1* | 2/2006 | Breiter et al. | 709/219 |
| 2006/0094360 | A1 | 5/2006 | Jung et al. | |
| 2006/0156315 | A1* | 7/2006 | Wood et al. | 719/328 |
| 2006/0174026 | A1 | 8/2006 | Robinson et al. | |
| 2006/0232573 | A1* | 10/2006 | Nitta et al. | 345/204 |
| 2007/0033522 | A1* | 2/2007 | Lin et al. | 715/526 |
| 2007/0220392 | A1* | 9/2007 | Bhaumik et al. | 714/742 |
| 2007/0294586 | A1* | 12/2007 | Parvathy et al. | 714/38 |
| 2008/0034289 | A1* | 2/2008 | Doepke et al. | 715/700 |
| 2008/0127060 | A1* | 5/2008 | Reamey | 717/106 |
| 2008/0240669 | A1 | 10/2008 | Oh et al. | |
| 2008/0243998 | A1 | 10/2008 | Oh et al. | |
| 2008/0282172 | A1* | 11/2008 | Bayang et al. | 715/744 |
| 2008/0301628 | A1* | 12/2008 | Lochmann | 717/107 |
| 2009/0144640 | A1* | 6/2009 | Schneider et al. | 715/760 |
| 2009/0204885 | A1* | 8/2009 | Ellsworth et al. | 715/234 |
| 2010/0042678 | A1 | 2/2010 | Park et al. | |
| 2010/0295770 | A1 | 11/2010 | Shim | |
| 2012/0204115 | A1 | 8/2012 | Barrett | |

FOREIGN PATENT DOCUMENTS

| | | |
|---|---|---|
| CN | 1961281 | 5/2007 |
| EP | 1187000 | 3/2002 |
| EP | 1253750 | 10/2002 |
| EP | 2 143 297 | 1/2010 |
| KR | 10-2002-0048188 | 6/2002 |
| KR | 10-2003-0071289 | 9/2003 |
| KR | 10-2006-0001550 | 1/2006 |
| KR | 10-2006-0105813 | 10/2006 |
| KR | 10-2007-0005987 | 1/2007 |
| KR | 10-2007-0074037 | 7/2007 |
| KR | 10-2008-0018061 | 2/2008 |
| KR | 10-2008-0089119 | 10/2008 |
| KR | 10-2008-0089134 | 10/2008 |
| WO | WO02/082814 | 10/2002 |
| WO | WO2008/023940 | 2/2008 |
| WO | WO2008/120890 | 10/2008 |

OTHER PUBLICATIONS

Lowet et al. "Content Sharing and Experience Sharing with Web4CE." Philips Research Laboratories, Mar. 2008.*
Extended European search report dated May 2, 2011 to European Application No. 09732983.3-2211.
Chinese Office Action dated Feb. 6, 2012, in Chinese Patent Application No. 200980113591.0.
Chinese Office Action dated Feb. 13, 2012, in Chinese Patent Application No. 200980113927.3.
Partial English-language translation of Chinese Office Action dated Apr. 18, 2012, in Chinese Patent Application No. 200980113575.1 (supplements reference AL in Information Disclosure Statement previously submitted on May 4, 2012).
International Search Report dated Dec. 7, 2009 to PCT International Application No. PCT/KR2009/001952.
International Search Report dated Nov. 27, 2009 to PCT International Application No. PCT/KR2009/001994.
International Search Report dated Dec. 8, 2009 to PCT International Application No. PCT/KR2009/001951.
Extended European Search Report issued Dec. 6, 2012 from European Patent Application No. 09731533.7.
Extended European Search Report issued Dec. 12, 2012 European Patent Application No. 09731966.9.
Extended European Search Report issued Dec. 14, 2012 from European Patent Application No. 09732302.6.
Second Chinese Office Action issued Nov. 19, 2012 from Chinese Patent Application No. 200980113575.1.
Third Chinese Office Action issued Oct. 26, 2012 from Chinese Patent Application No. 200980113591.0.
Third Chinese Office Action issued Oct. 26, 2012 from Chinese Patent Application No. 200980113927.3.
"Web-based Protocol and Framework for Remote User Interface on UPnP Networks and the Internet (Web4CE)", CEA Standard, Jul. 2007, 176 pages.
Chinese Office Action dated May 16, 2013 from Chinese Patent Application No. 200980113575.1.
Chinese Decision of Rejection dated Aug. 22, 2013 from Chinese Patent Application No. 200980113591.0.
Chinese Office Action mailed Feb. 5, 2013 in Chinese Patent Application No. 200980113591.0.
Chinese Office Action mailed Mar. 7, 2013 in Chinese Patent Application No. 200980113927.3.
Chinese Decision of Rejection dated Nov. 8, 2013 from Chinese Patent Application No. 200980113575.1, 25 pages.
Korean Office Action dated Dec. 30, 2014 from Korean Patent Application No. 10-2008-0079032, 10 pages.
Korean Office Action dated Jan. 19, 2015 from Korean Patent Application No. 10-2008-0079036, 12 pages.

* cited by examiner

| USER HANDLE | PRESENTATION | EVENT | FUNCTION CALL |
|---|---|---|---|
| Device A | Local | Local | Local |
| Device A | Local | Local | Remote |
| Device A | Local | Remote | Remote |
| Device A | Local | Remote | Local |
| Device A | Remote | Remote | Local |
| Device A | Remote | Local | Local |
| Device A | Remote | Local | Remote |
| Device A | Remote | Remote | Remote |

METHOD AND APPARATUS FOR PROVIDING AND RECEIVING USER INTERFACE

CROSS-REFERENCE TO RELATED APPLICATIONS

This application claims the benefit of Korean Patent Application No. 10-2008-0079033, filed on Aug. 12, 2008, and Korean Patent Application No. 10-2008-0094897, filed on Sep. 26, 2008, in the Korean Intellectual Property Office, and U.S. Provisional Patent Application No. 61/045,787, filed on Apr. 17, 2008, in the U.S. Patent and Trademark Office, and the disclosure of which is incorporated herein in their entirety by reference.

BACKGROUND

1. Field

One or more embodiments relate to a method and apparatus providing and receiving a user interface (UI).

2. Description of the Related Art

Various types of multimedia devices have been developed and a convergence of the multimedia devices has been accelerating. Among multimedia deices, it has become common to exchange multimedia data or to control each other by forming a network of different types of multimedia devices.

Remote control between devices that are physically located far apart from each other is performed via a remote user interface (RUI). A UI server provides a UI to a UI client to control the UI server. The UI client controls the UI server using the UI provided to the UI client by the UI server. For example, the UI server provides a web page to the UI client so that the UI client can remotely control the UI server. The UI client displays the web page to a user through a web browser. The user selects a control operation using the displayed UI, that is, the web page, to control the UI server.

In CEA-2014 that is a related art for the remote control of consumer electronics (CE) devices, the UI server generates a web page and provides the web page to the UI client. The UI client displays the received web page through a web browser.

SUMMARY

Additional aspects and/or advantages will be set forth in part in the description which follows and, in part, will be apparent from the description, or may be learned by practice of the invention.

One or more embodiments include a method and apparatus providing and receiving a user interface.

One or more embodiments correspondingly include a computer readable recording medium recording a program executing the above method.

Additional aspects will be set forth in part in the description which follows and, in part, will be apparent from the description, or may be learned by practice of the invention.

To achieve the above and/or other aspects, one or more embodiments may include a method of providing a user interface to a user interface client from a user interface server, the method comprising encoding information on a plurality of user interface scenes in a multimedia data format, and transmitting the multimedia data to the user interface client.

The information on the plurality of user interface scenes is to display a user interface at a plurality of different user interface clients.

The information on the plurality of user interface scenes comprises presentation information to present objects included in the user interface scene in a scene, event information on events generated by the objects, and function information on functions called to process the events.

To achieve the above and/or other aspects, one or more embodiments may include a method of receiving a user interface from a user interface server in a user interface client, the method comprising receiving multimedia data including information on a plurality of user interface scenes and decoding the multimedia data, and displaying the plurality of user interface scenes by reproducing the decoded multimedia data.

To achieve the above and/or other aspects, one or more embodiments may include a user interface server providing a user interface to a user interface client, the user interface server comprising an encoding unit encoding information on a plurality of user interface scene in a multimedia data format, and a transmission unit transmitting the multimedia data to the user interface client.

To achieve the above and/or other aspects, one or more embodiments may include a user interface client receiving a user interface from a user interface server, the user interface client comprising a decoding unit receiving multimedia data including information on a plurality of user interface scenes and decoding the multimedia data, and a reproduction unit displaying the plurality of user interface scenes by reproducing the decoded multimedia data.

To achieve the above and/or other aspects, one or more embodiments may include a computer readable recording medium recording a program executing any one of the above methods.

To achieve the above and/or other aspects, one or more embodiments may include a method of providing a user interface to a user interface client from a user interface server, the method comprising encoding the user interface in a multimedia data format, and transmitting the multimedia data to the user interface client, wherein the multimedia data includes information on a protocol of a control message transmitted to the user interface server when the user interface client performs a control operation according to the user interface.

To achieve the above and/or other aspects, one or more embodiments may include a method of receiving a user interface from a user interface server in a user interface client, the method comprising receiving a multimedia data including a first user interface and decoding the multimedia data, receiving information on a content provided to a user via the user interface, and generating a second user interface by coupling the first user interface and the information on the content.

To achieve the above and/or other aspects, one or more embodiments may include a user interface server providing a user interface to a user interface client, the user interface server comprising a user interface generation unit generating the user interface, a user interface encoding unit encoding the user interface in a multimedia data format, and a user interface providing unit transmitting the multimedia data to the user interface client, wherein the multimedia data includes information on a protocol of a control message transmitted to the user interface server when the user interface client performs a control operation according to the user interface.

To achieve the above and/or other aspects, one or more embodiments may include a user interface client receiving a user interface from a user interface server, the user interface client comprising a user interface decoding unit receiving a multimedia data including a first user interface and decoding the multimedia data, and a user interface coupling unit generating a second user interface by coupling the first user interface and information on a content provided to a user via the user interface.

To achieve the above and/or other aspects, one or more embodiments may include a computer readable recording medium recording a program for executing any of the above-described methods of providing or receiving a user interface.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EMBODIMENTS

Figure 1:
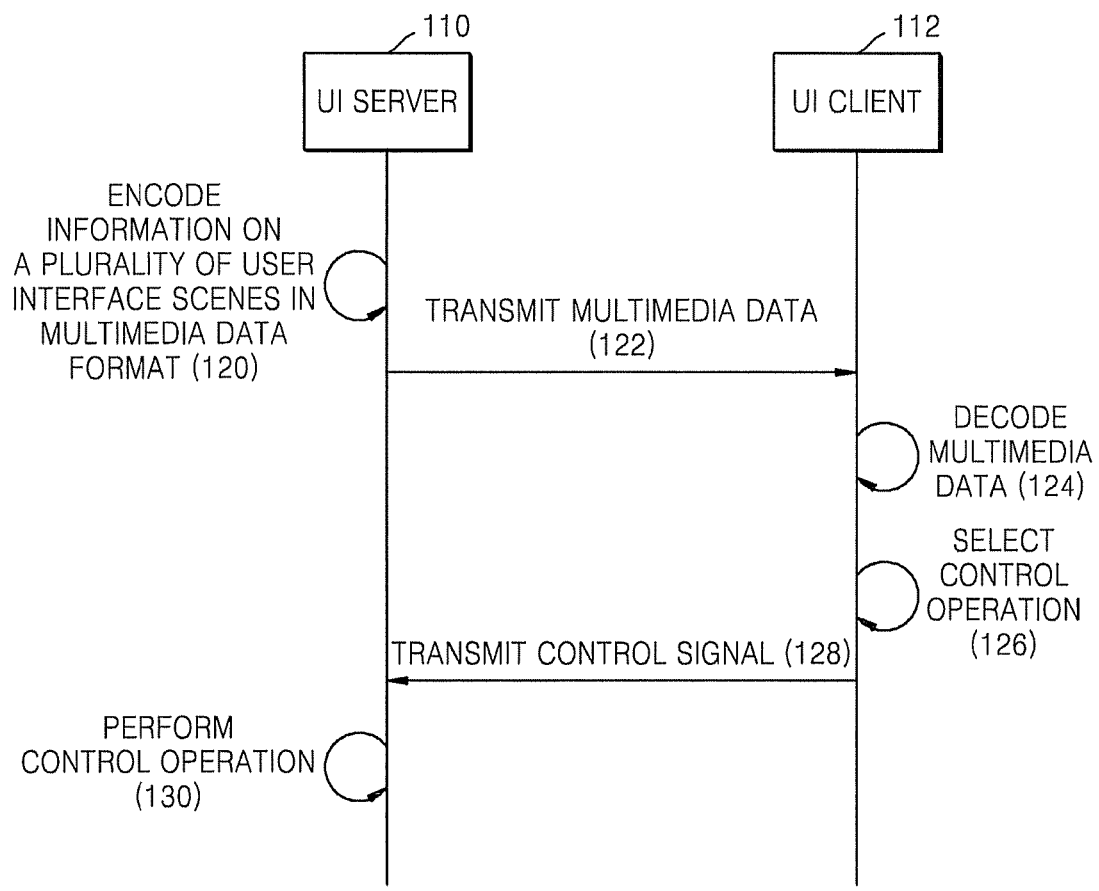
FIG. 1 is a flowchart of a method of providing and receiving a UI according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. The embodiments are described below to explain the present invention by referring to the figures. FIG. 1 is a flowchart of a method of providing and receiving a user interface (UI) according to an embodiment. In the following embodiments, a user interface (UI) includes a user interface, such as a widget or a gadget, displayed on a part of a screen.

Referring to FIG. 1, in operation 120, a UI server 110 according to an embodiment encodes information on a plurality of UI scenes in multimedia data format. Operations 120, 122, 124, 126, 128, and 130 of FIG. 1 are described in detail with reference to subsequent figures.

Operation 120 is described in detail with reference to FIG. 2.

Figure 2:
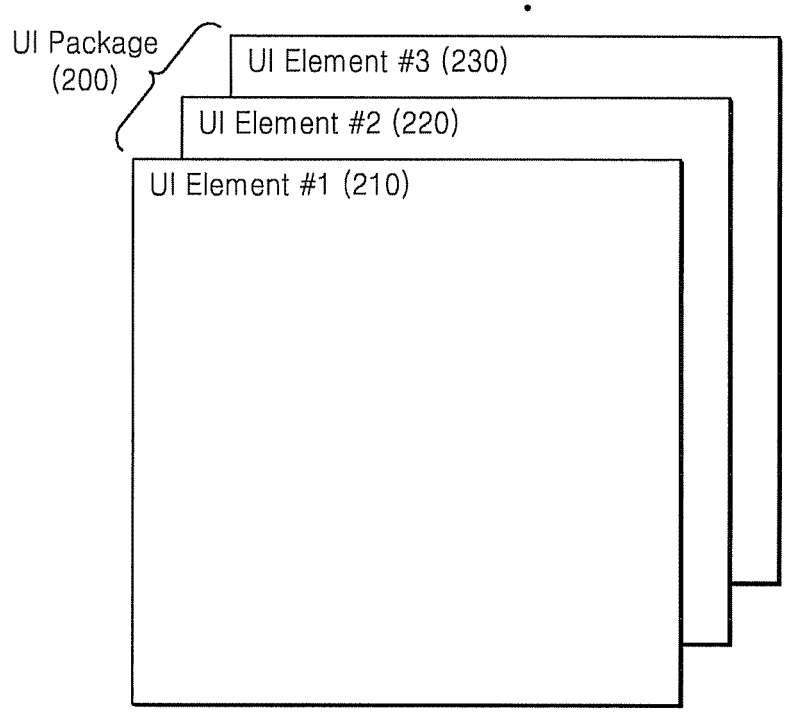
FIG. 2 illustrates a UI package according to an embodiment.

FIG. 2 illustrates a UI package 200 according to an embodiment. Referring to FIG. 2, a UI package 200 according to an embodiment includes a plurality of UI scenes, that is, a plurality of UI elements #1, #2, and #3 (210-230, respectively).

In an example shown in FIG. 2, each of the UI elements #1, #2, and #3 210-230 includes information related to at least one UI scene. The UI scene represents a scene including at least one UI object. The UI scenes may be classified by the included UI object. A change in at least one of the UI objects forming the UI scene indicates a change of the UI scene. The UI scene may include one or more UI objects. That is, the UI scene may include only one UI object or may include a plurality of UI objects. The UI object represents the minimum unit of the UI capable of generating a predetermined event and calling a predetermined function based on the generated event.

A UI for a predetermined control operation may include a plurality of UI scenes. For example, information on the plurality of UI scenes, that is, the UI package 200, may include information on UI scenes continuously displayed at a UI client 112 as a user selects a predetermined object at a UI scene.

An initial UI scene in which information on movies to be selected by a user is displayed in the form of a thumb-nail may be stored in the UI element #1 210. When the user selects one of the movies from the initial UI scene, the next scene displaying a scene controlling reproduction of the movie with detailed information on the movie may be stored in the UI element #2 220. The initial UI element and the UI elements of the next scene may exchange information with each other.

The information on the UI scenes may be information for displaying a UI of the UI server 110 at a plurality of different UI clients 112. When there are multiple UI clients 112 receiving the UI from the UI server 110 via a network, different UI clients 112 may often have different capabilities. The UI clients 112 may be different in terms of supporting resolution of a display device and the capacity of an installed memory or CPU. Accordingly, the UI package 200 may include the information on the UI scenes that may be displayed at each of the different UI clients 112.

For example, when the UI server 110 is an IP-settop box connected to a digital TV, a computer, or a portable media player (PMP) via a network, the resolutions of display devices of and hardware performance of the digital TV, the computer, and the PMP are different from one another. Accordingly, the UI element #1 210 includes information on the UI scene that the digital TV may display. The UI element #2 220 includes information on the UI scene that the computer may display. The UI element #3 230 includes information on the UI scene that the PMP may display. Next, the UI package 200 is provided to all sorts of the UI clients 112 so that each of the UI clients 112 may select and display one of the provided UI scenes.

In the above description, the performance of the UI client 112 is discussed as an example, a network environment or the preference of a UI client 112 may be a standard for selecting a UI scene from the UI package 200. Also, a bandwidth of a network that the UI client 112 connects or a personal profile of a user of the UI client 112 may be a standard for selecting the UI scene. The personal profile may include the age, the nationality, and the language(s) of a user, or combinations or sub-combinations thereof. The information on the user preference may include structured information generated according to a standard such as MPEG-21 usage environment description (UED) or W3C composite capabilities/preference profile (CC/PP), for example.

Also, the information on the UI scenes may be information for sequentially displaying the UI scenes. For example, the UI element #1 210 may include a portion of an object of the UI scene while the UI element #2 220 may include the other portion of the object of the UI scene, which will be described in detail with reference to FIG. 5.

Referring back to FIG. 1, in operation 120, the information on the UI scenes is encoded by the UI server 110 in multimedia data format. When the UI is generated in the form of a web page and transmitted to the UI client 112 as in the related art, there may be a limit in the presentation of a UI. Also, the UI client 112 may additionally include a software or hardware module to present a UI. However, the above structure is not suitable for a device having a limited usable hardware resource as in the case in which the UI client 112 is a mobile device.

Thus, in operation 120, the UI server 110 encodes the UI by forming a UI package based on MPEG data, for example. That is, the UI server 110 encodes the information on the UI scenes in multimedia data format that is reproducible by various devices. The UI scenes are encoded in a multimedia data format including multimedia, that is, video, audio, and/or text. Since the UI scenes may be encoded in the multimedia data format including various media, various and eye-catching effects may be applied to the UI scenes. Since most devices including a mobile device are capable of reproducing multimedia including a moving picture and voice, the UI is encoded in the multimedia data format.

For example, the UI may be encoded based on an MPEG (Moving Picture Experts Group) standard. The MPEG standard is an international standard for a method of compressing and encoding a moving picture and audio and includes a variety of standard versions such as MPEG-1, MPEG-2, MPEG-4, and MPEG-7. The UI server 110 generates a UI scene using the MPEG standard. For example, by encoding a UI in a moving picture format to be reproduced by the UI client 112, the above-described compatibility problem may be solved.

In particular, the UI scene may be encoded using an object-based multimedia encoding method such as MPEG-4 binary format for scene (BIFS) and lightweight applications scene representation (LASeR) for a mobile device, for example. By regarding objects included in the UI scene as objects encoded based on BIFS or LASeR, the space-time arrangement of objects at the UI scene may be encoded using a scene description method according to BIFS or LASeR.

BIFS or LASeR include information on the scene description method to present the space-time arrangement of the objects included in an image. Accordingly, the space-time arrangement of UI objects such as a button or a menu may be presented using BIFS or LASeR.

Multimedia data including an image of the UI, for example, AV stream, is generated by encoding the UI using an image codec such as BIFS or LASeR, for example. When the UI client 112 reproduces a received AV stream, the UI is displayed. Since the UI is displayed by simply reproducing the AV stream, devices capable of reproducing the AV stream may display the UI provided by the UI server 110. Thus, the UI scene including the UI object is encoded by using the object-based multimedia encoding method according to the present invention. All devices capable of reproducing multimedia data encoded according to BIFS or LASeR may reproduce a UI having a variety of multimedia effects.

Figure 3:
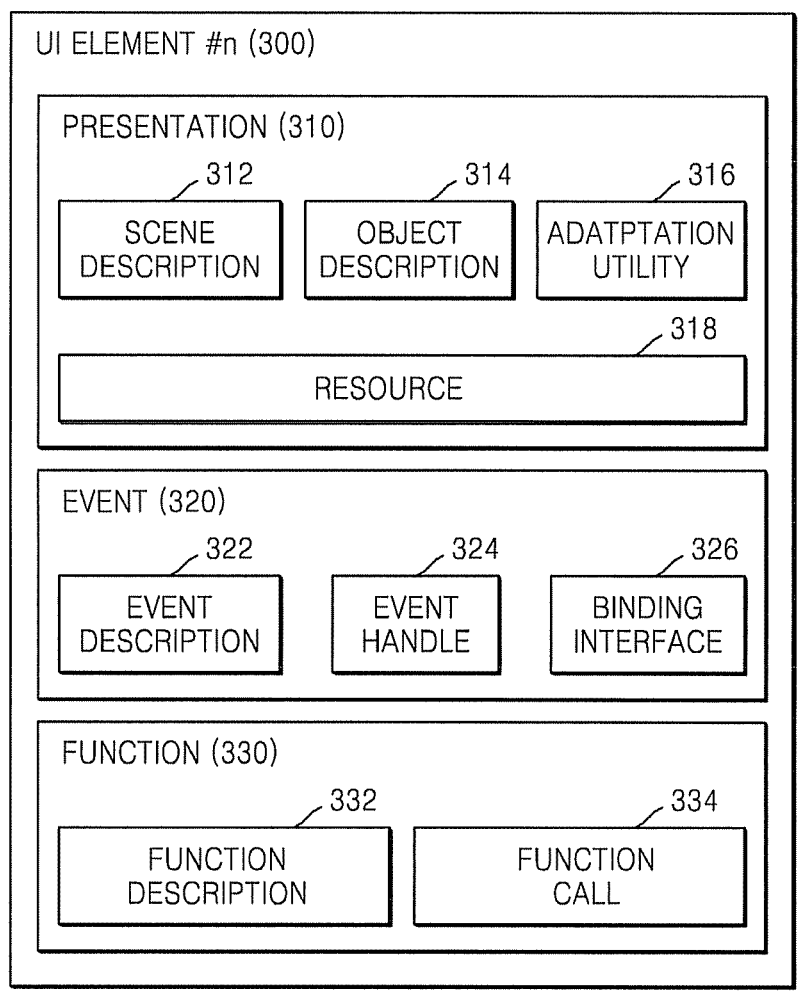
FIG. 3 illustrates the structure of a UI element according to an embodiment.

FIG. 3 illustrates the structure of a UI element according to an embodiment. Referring to FIG. 3, when a UI element 300 includes information on a UI scene, the UI element 300 includes presentation information 310 on the presentation of objects included in the UI scene on a scene, event information 320 on events generated by the objects, and function information 330 on functions called to process the events.

Since the information on the presentation, the event, and the function are structurally classified and included in the UI elements #1, #2, and #3 210, 220, and 230, a dynamic expansion of the UI is possible, which is described later with reference to FIG. 4.

The presentation information 310 indicates that how the objects included in the UI scene are arranged in a scene and which media is used for presentation. A scene description 312 is information to describe the structure of a UI scene and may include information to describe a layout, a form, a theme, and a template of a scene, or combinations or sub-combinations thereof. Also, the scene description 312 may include information on a method of presenting the UI scene. When the overall UI scene is presented using a special effect such as fade out or fade in, the scene description 312 may include information on the special effect.

An object description 314 is information on the method of presenting the objects included in the scene and includes information indicating which one of media including an image, video, and audio is used to present each of the UI objects. Also, the object description 314 may include information on the presentation time and method of the objects. For example, when the objects included in the UI scene are presented in the scene on different times, information on a time for timing adjustment may be included in the object description 314. Also, the object description 314 may include information on the presentation method when the objects are presented in the scene using the special effects such as fade out or fade in. Furthermore, when an animation effect in which the sizes or shapes of the objects are not fixed and continuously moved is used, the object description 314 may include information on the presentation method.

An adaptation utility 316 includes information for the dynamic configuration of a UI scene. For example, the adaptation utility 316 includes information on the dynamic configuration of a scene when a UI scene includes UI objects A, B, C, and D and the UI client 112 uses only the UI objects A and B, considering the performance of itself, in the presentation of the UI scene.

The adaptation utility 316 includes information on the performance of the UI client 112 and a standard for dynamically configuring a scene according to the performance of the UI client 112. For example, the adaptation utility 316 includes information on a standard for the dynamic configuration by which a UI client having a display performance of a standard definition (SD) level presents only the objects A and B in the UI scene while a UI client having a display performance of a high definition (HD) level represents all objects A, B, C, and D in the UI scene. All respective characteristics of the UI client 112 including the performance of the UI client 112 and a network environment or the preference of the UI client 112 may be the dynamic configuration standard.

Also, the adaptation utility 316 may include information on a standard for the selection of a UI element. As described above, the UI package 200 includes information on a plurality of UI scenes to display a UI at a plurality of different UI clients 112.

Thus, when the different UI clients 112 select and display one of the UI elements 210, 220, and 230 from the UI package 200, information that may be referred to for selection is needed. The adaptation utility 316 may include information that may be a standard for the selection.

For example, if the information on the minimum performance to display each of the UI elements 210, 220, and 230 is included in the adaptation utility 316, the UI client 112 refers to the information and selects one of the UI elements 210, 220, and 230 from the UI package 200 that may be displayed by the UI client 112.

A resource 318 includes sources to present an UI scene and may include multimedia data such as an image, moving picture, and audio. The presentation information 310 to present objects included in the UI scene in a scene may include information for forming a UI scene including an iconized UI, for example, the UI scene including an UI iconized in the scene description 312, the object description 314, or the adaptation utility 316.

An iconized UI according to an embodiment is now explained with reference to FIG. 11.

Figure 11:
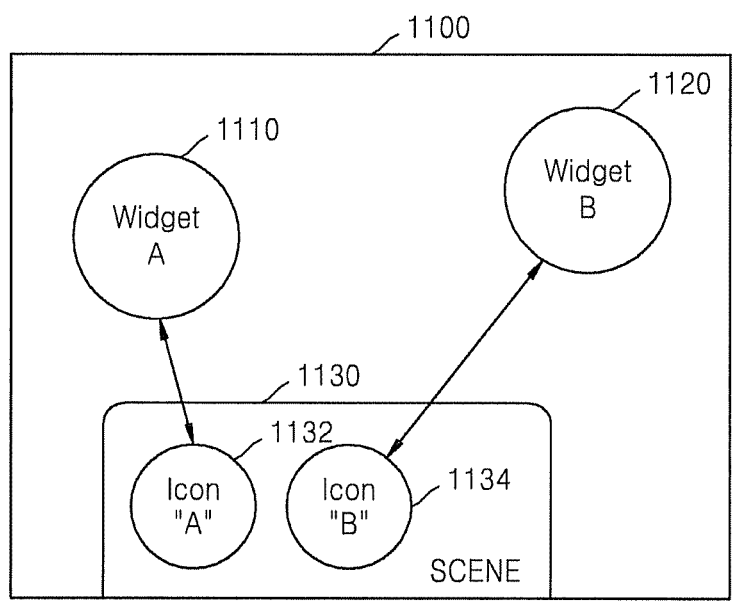
FIG. 11 illustrates a UI scene including an iconized UI according an embodiment of the present invention.

FIG. 11 illustrates a UI scene 1100 including an iconized UI according to an embodiment. Referring to FIG. 11, a widget A 1110 and a widget B 1120 are displayed on a UI scene 1100. At the same time, an icon A 1132 corresponding to the widget A and an icon B 1134 corresponding to the widget B are displayed in a predetermined area, that is, a dock 1130, in the lower portion of a UI scene 1100. A user may select the widget A 1110 or the widget B 1120 by selecting the icon A 1132 or the icon B 1134 located on the dock 1130. The icons A and B 1132 and 1134 that are intuitive are located on the dock 11300. For example, when the widget A 1110 is a widget indicating weather information, an icon having a thermometer is displayed on the dock 1130 so that a user may intuitively know that the icon is related to the widget A 1110. The presentation information 310 to present the objects included in the UI scene may include information on icons and information on the size and position of the dock 1130 to present the UI scene 1100 of FIG. 11.

The icons A and B 1132 and 1134 displayed on the dock 1130 and the widgets A and B 1110 and 1120 may be interlinked. As described above, when the widget A 1110 is a widget indicating weather information, the icon A 1132 and the widget A 1110 may be interlinked so that the shape of the icon A 1132 may be changed according to the change of weather. For example, when the weather is sunny, an icon having a shape of the sun is displayed on the dock 1130. When the weather is overcast or precipitating, an icon having a shape of a cloud is displayed on the dock 1130.

Referring again to FIG. 3, the event information 320 includes information on events generated by the objects included in the UI scene. Also, the event information 320 includes information on events generated by a result of interaction between the UI object and a user, such as, the selection of an object by the user.

An event description 322 includes information on events generated by the objects and describes the type of user interactions that may be performed by the UI object such as click, touch, and rotation, or combinations or sub-combinations thereof.

An event handle 324 includes information on a method of processing the generated events. For example, when an event "click" is defined in the even description 322, the event handle 324 includes information on how to process the event "click". If a clicked UI object is an object to control volume, the event handle 324 includes information for processing the event "click" by analyzing the event "click" as volume up or volume down.

A binding interface 326 includes information on mapping between the defined events and a device application programming interface (API) called to process the events. The binding interface 326 includes information on mapping between the events and a device API called to process the events to correlate the events generated by the UI objects and functions called by the events.

The function information 330 includes detailed information on device APIs called to perform functions. A function description 332 includes information on detailed operations of the device APIs called by the events, that is, detailed functions that a user may use via the device APIs. For example, when a device API for a vibration function is called, the function description 332 includes information on a detailed function such as control of vibration strength or control of vibration time that may be embodied by the device API.

A function call 334 includes information on a detailed parameter of a function called by a UI object. For example, when the device API for a vibration function is described in the function description 332 as being able to control the vibration strength and vibration time at five levels of 1-5, the function call 334 includes detailed parameters indicating at which level of the five levels of the vibration strength and vibration time the function is called. For example, when a UI object A calls a vibration function with a vibration strength of level 3 and a vibration time of level 1 of the five levels of the vibration strength and vibration time described in the function description 332, detailed parameters for the above function call may be included in the function call 334.

As shown in FIG. 3, since information related to the presentation, event and function is classified and included in the UI elements 210, 220, and 230, the UI scene may be dynamically configured, which will be described in detail with reference to FIG. 4.

Figures 4, 5:
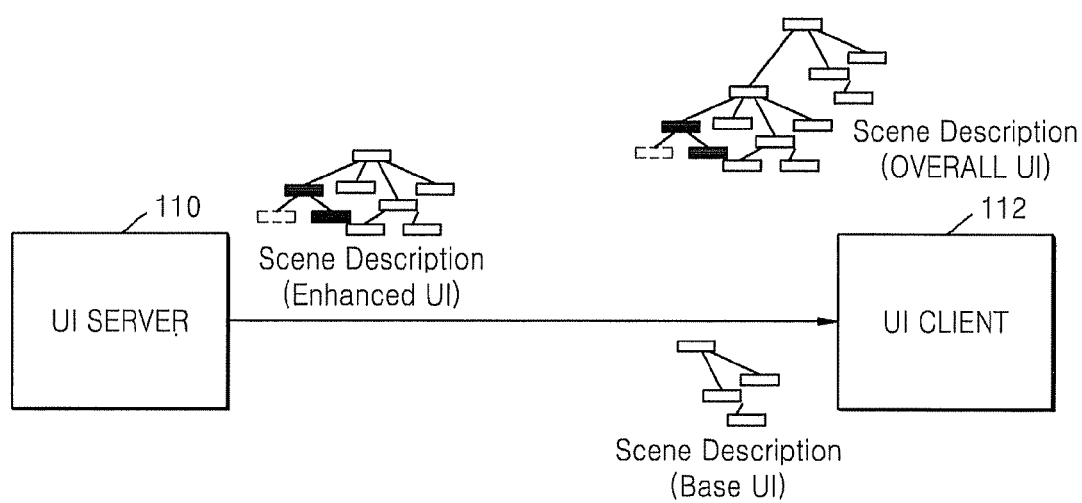
FIG. 4 illustrates an example of the dynamic configuration of a UI scene according to an embodiment.
FIG. 5 illustrates a method of transmitting information on a plurality of UI scenes according to an embodiment.

FIG. 4 illustrates an example of the dynamic configuration of a UI scene according to an embodiment. Referring to FIG. 4, the presentation information 310, the event information 320, and the function information 330 are combined so that the objects included in different UI scenes may be dynamically configured.

For example, for the UI client 112 to dynamically configure the UI scene, the scene description 312, the object description 314, the adaptation utility 316, and the resource 318 of the UI client 112, that is, "Local", are used as the presentation information 310 to present the UI object A. The event description 322, the event handle 324, the binding interface 326, the function description 332, and the function call 334 of the UI server 110, that is, "Remote", are used as the event information 320 and the function information 330. While performing the event and function of the UI provided by the UI server 110, the UI client 112 may freely configure the presentation of the UI scene.

Referring back to FIG. 1, in operation 122, the UI server 110 transmits information on a plurality of UI scenes that is encoded in a multimedia data format, to the UI client 112. That is, by transmitting the multimedia data by streaming to the UI client 112, the UI client 112 may reproduce the UI scene. Also, the UI may be provided by downloading to the UI client 112, rather than by streaming.

FIG. 5 illustrates a method of transmitting information on a plurality of UI scenes according to an embodiment. Referring to FIG. 5, when the UI server 110 transmits the multimedia data including information on the UI scenes, that is, the UI package 200, to the UI client 112, the respective UI elements 210, 220, and 230 may be sequentially transmitted.

The UI server 110 first transmits the UI element #1 210 including a portion of the UI object to the UI client 112. Then, when the UI displays a UI scene including a portion of the UI object according to the UI element #1 210, the UI element #2 220 including the other UI object is transmitted to the UI client 112. For example, the UI client 112 receiving the UI package 200 may first display a UI scene including a portion of the object according to the UI element #1 210 and then a complete UI scene including the other UI objects after receiving the UI element #2 220. The UI client 12 may determine whether to display the complete UI scene using the UI element #2 220 according to the performance of the UI client 112, network environment, and user preference, or a combination or sub-combination thereof.

Referring back to FIG. 1, in operation 124, the UI client 112 decodes the received multimedia data. The decoded multimedia data is reproduced to display a UI scene.

In operation 126, the UI client 112 selects a predetermined control operation using the UI scene displayed in operation 124. The predetermined control operation may be selected as a user generates an event in a UI object of the UI scene.

Figure 6:
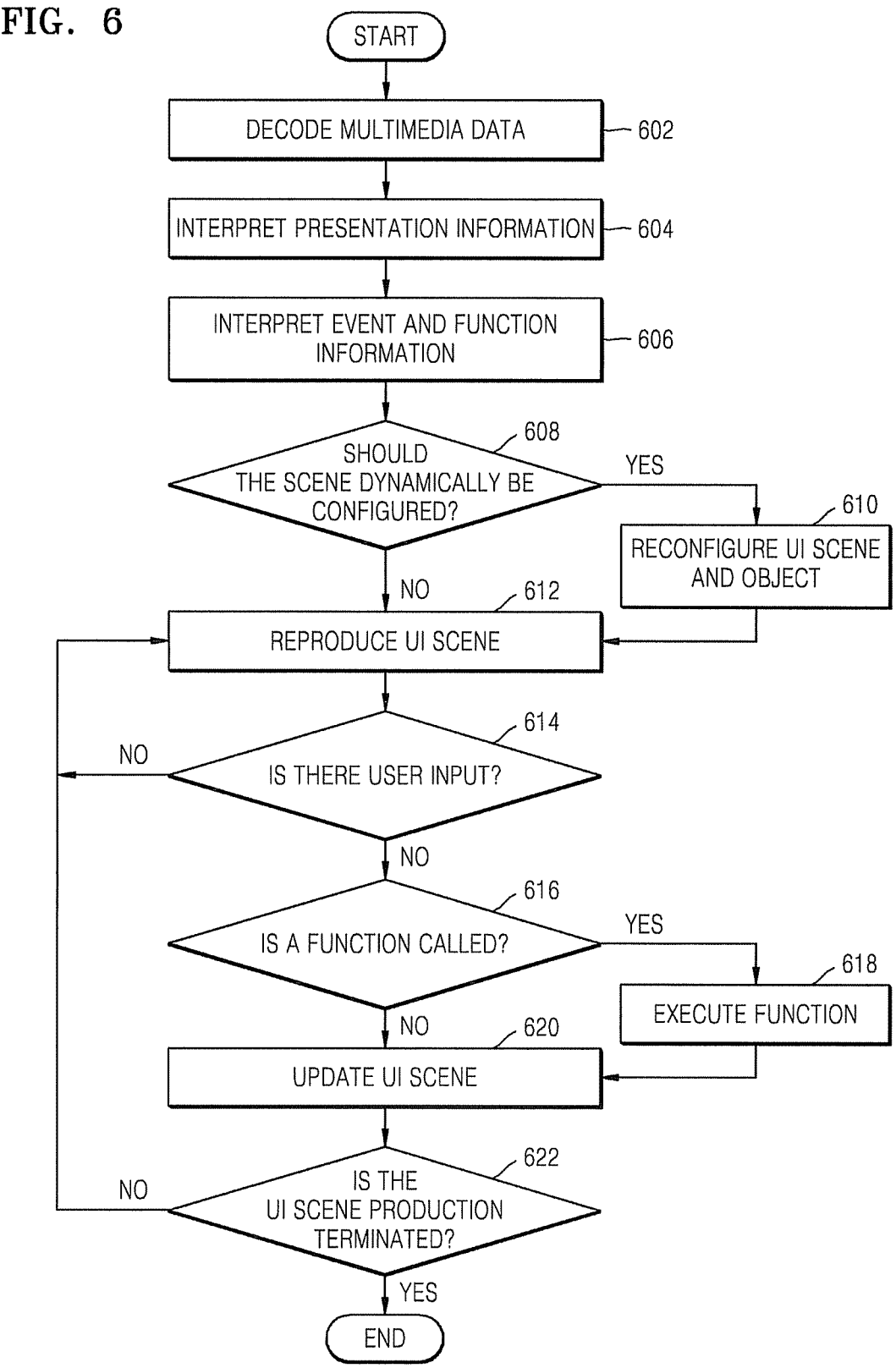
FIG. 6 is a flowchart for explaining a method according to an embodiment in which a UI client reproduces a UI scene.

FIG. 6 is a flowchart for explaining a method according to an embodiment in which a UI client reproduces a UI scene. FIG. 6 shows in detail operations 124 and 126. Referring to FIG. 6, in operation 602, the UI client 112 decodes the multimedia data including the information on the UI scenes. As a result of decoding, information on the UI package 200 is generated.

In operation 604, the presentation information 310 to present objects included in the UI scene in a scene is interpreted. In operation 606, the UI client 112 interprets the event information 320 on the events generated by the objects included in the UI element 300 and the function information 330 on the function called to process the events.

In operation 608, the UI client 112 determines whether the UI scene needs to be dynamically reconfigured, considering the performance of the UI client 112, network environment, and user preference. The necessity of the reconfiguration is determined referring to the information included in the adaptation utility 316.

If the reconfiguration is determined to be needed in operation 608, in operation 610, the UI client 112 reconfigures the UI scene and object. Accordingly, a portion of the objects included in the UI scene is displayed or the UI scene is reconfigured by adjusting the arrangement of the objects.

In operation 612, the UI client 112 displays the UI scene by reproducing the decoded multimedia data, that is, the UI package 200. In operation 614, the UI client 112 receives a predetermined input from a user. When there is a user input, a predetermined event is generated according to the user input. When there is no user input, the program goes back to operation 612 to repeat the reproduction of the UI scene.

In operation 616, the UI client 112 determines whether a function for the predetermined control operation is called according to the event generated in Operation 614. Determination is made as to whether the function is called according to the generated event because there is a case in which, even if an event is generated, only a UI scene is updated without calling a function for a control operation.

In operation 618, the UI client 112 calls a predetermined control function according to the generated event. In operation 620, the UI client 112 updates the UI scene. In operation 622, the UI client 112 determines whether to terminate the reproduction of the UI scene. When it is determined that the reproduction is not terminated, the method of FIG. 6 returns to operation 612 and continues to reproduce the UI scene.

Referring back to FIG. 1, in operation 128, the UI client 112 transmits a predetermined control signal to the UI server 110 based on the control operation selected in operation 126. When a device controlled using the UI is not the UI server 110, the control signal may be transmitted to another device, not the UI server 110.

In operation 130, the UI server 110 performs a control operation according to the control signal received from the UI client 112. For example, a content such as movie, drama, or MP3 songs are transmitted to the UI client 112 or a control operation such as reproduction, stop, fast forwarding, or fast rewinding of the content is performed. When the control signal is transmitted to other device not the UI server 110 in operation 128, the other device performs the control operation.

Figure 7:
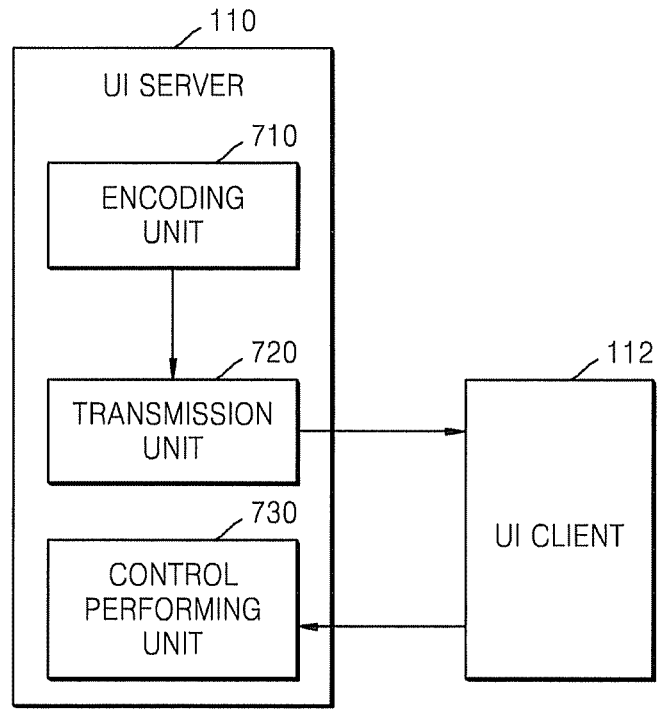
FIG. 7 illustrates a UI server according to an embodiment.

FIG. 7 illustrates a UI server according to an embodiment. Referring to FIG. 7, the UI server 110 according to the present embodiment includes an encoding unit 710, a transmission unit 720, and a control performing unit 730.

The encoding unit 710 encodes information on a plurality of UI scenes in a multimedia data format. As described above, the UI scenes may be encoded using an object-based multimedia encoding method such as an MPEG standard, for example, MPEG-4 binary format for scene (BIFS) and lightweight applications scene representation (LASeR) for a mobile device, for example.

The transmission unit 720 transmits multimedia data generated as a result of the encoding in the encoding unit 710 to the UI client 112. That is, the transmission unit 720 transmits the UI package 200 including the information on the UI scenes to the UI client 112. As described with reference to FIG. 5, the respective UI elements 210, 220, and 230 included in the UI package 200 may be sequentially transmitted at a time interval.

The control performing unit 730 receives a control signal from the UI client 112 and performs a predetermined control operation. That is, the control performing unit 730 performs a predetermined control operation by receiving the control signal transmitted by the UI client 112 based on the UI scenes provided by the transmission unit 720.

Figure 8:
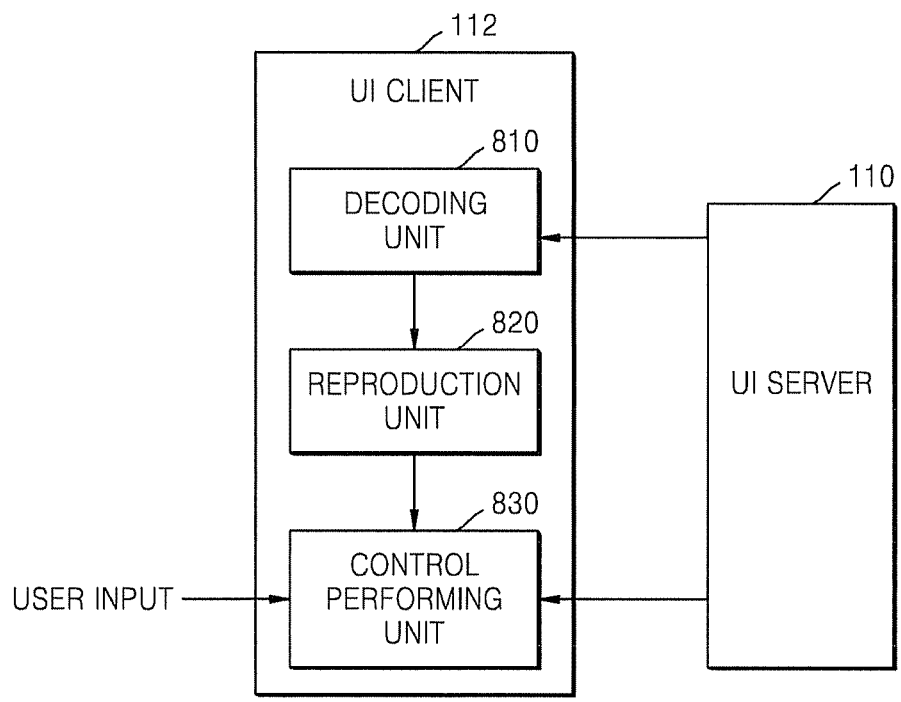
FIG. 8 illustrates a UI client according to an embodiment.

FIG. 8 illustrates a UI client 112 according to an embodiment. Referring to FIG. 8, the UI client 112 according to the present embodiment includes a decoding unit 810, a reproduction unit 820, and a control performing unit 830. The decoding unit 810 receives multimedia data including information on a plurality of UI scenes from the UI server 110 and decodes the received multimedia data.

The reproduction unit 820 displays the decoded multimedia data using a predetermined display device. The UI scene may be displayed using a method of reproducing a general moving picture by reproducing the multimedia data according to an MPEG standard, for example.

The control performing unit 830 generates a predetermined control signal based on user input according to the UI scene displayed by the reproduction unit 820. Then, a generated control signal is transmitted to the UI server 110. The user input may be transmitted to the control performing unit 830 through a variety of UI devices such as a keyboard, a mouse, or a touch screen, for example.

Figure 9:
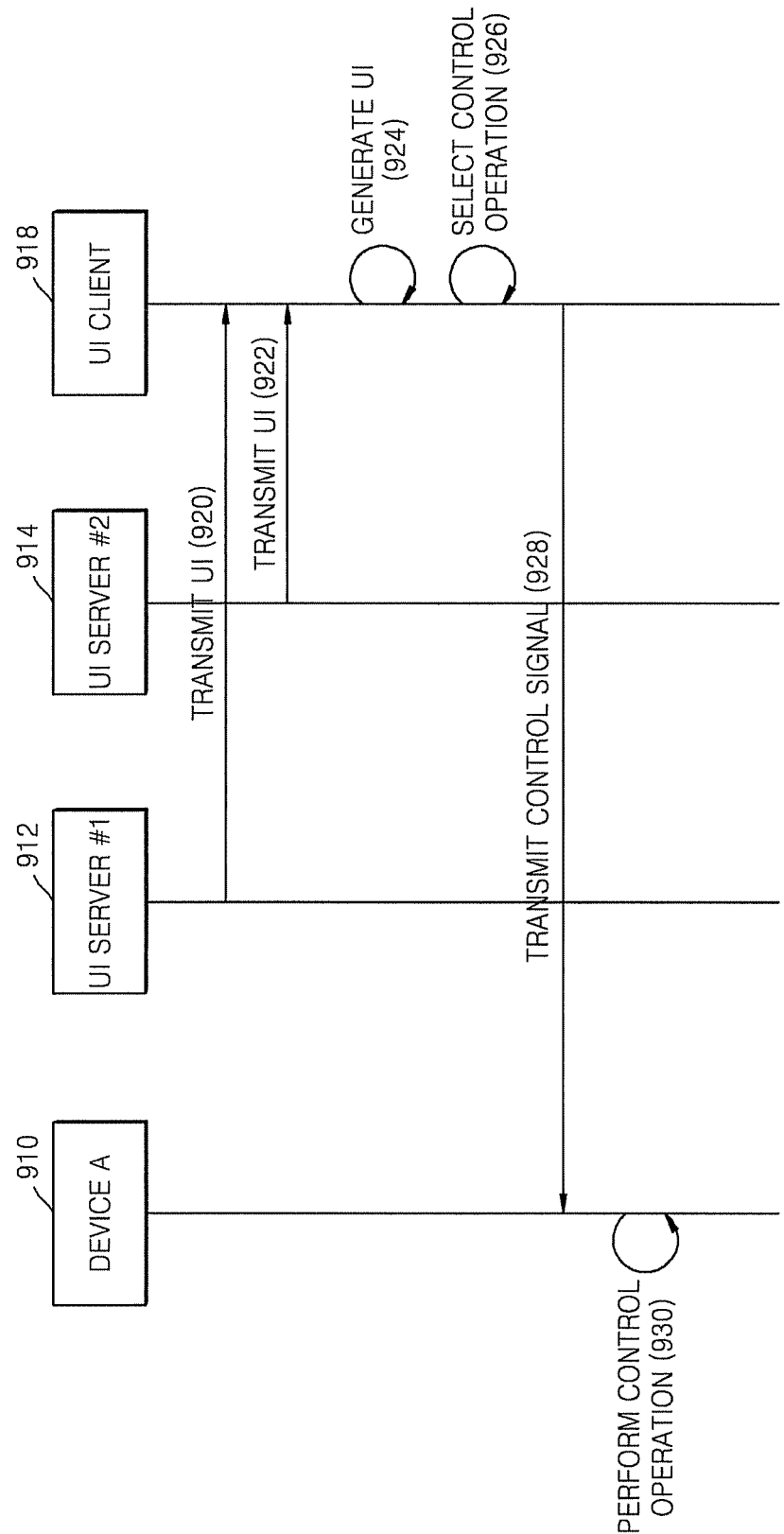
FIG. 9 illustrates a flowchart of a method of providing a UI according to another embodiment.

FIG. 9 illustrates a flowchart of a method of providing a UI according to another embodiment. FIG. 9 illustrates a method in which a UI client 918 receives a UI when a device A 910 does not include the UI for controlling the device A 910. Referring to FIG. 9, in operations 920 and 922, a UI server #1 912 and a UI server #2 914 transmit UIs required for controlling the device A 910 to the UI client 918. Since the device A 910 does not include a UI, other UI servers provide the UI.

When one of the UI server #1 912 and the UI server #2 914 includes a complete UI for controlling the device A 910, the UI server transmits the complete UI to the UI client 918. However, if neither the UI server #1 912 nor the UI server #2 914 includes a complete UI for controlling the device A 910, the UI client 918 receives a portion of the UI from the UI server #1 912 and the other portion from the UI server #2 914 and combines the received UIs.

For example, when receiving a UI for reproducing MP3 of the device A 910, the UI client 918 may receive a UI related to "Play" and "Pause" of the MP3 from the UI server #1 912 and a UI related to "Fast forward" and "Rewind" from the UI server #2 914. In operations 920 and 922, the UI received from the UI server #1 912 and the UI server #2 914 may be a widget.

In operation 924, the UI client 918 generates a new UI for control of the device A 910 by combining the received UIs in Operations 920 and 922. For example, when the UI is a widget, a new widget C may be generated by combining a widget A received from the UI server #1 912 and a widget B received from the UI server #2 914.

A new UI may be generated in consideration of the performance of the UI client 918, the network environment, and the user preference, or combinations or sub-combinations thereof. For example, when the language that a user uses is English, UI objects may be display in English. When a color that a user prefers is blue, a UI using a blue theme may be generated.

In operation 926, the UI client 918 selects a predetermined control operation based on the UI generated in operation 924. The UI generated in operation 924 is displayed and a predetermined control operation is selected according to the user input based on the displayed UI.

In operation 928, the UI client 918 transmits a predetermined control signal to the device A 910 according to the selection in operation 926. In operation 930, the device A 910 performed a predetermined control operation according to the control signal received in operation 928.

Figure 10:
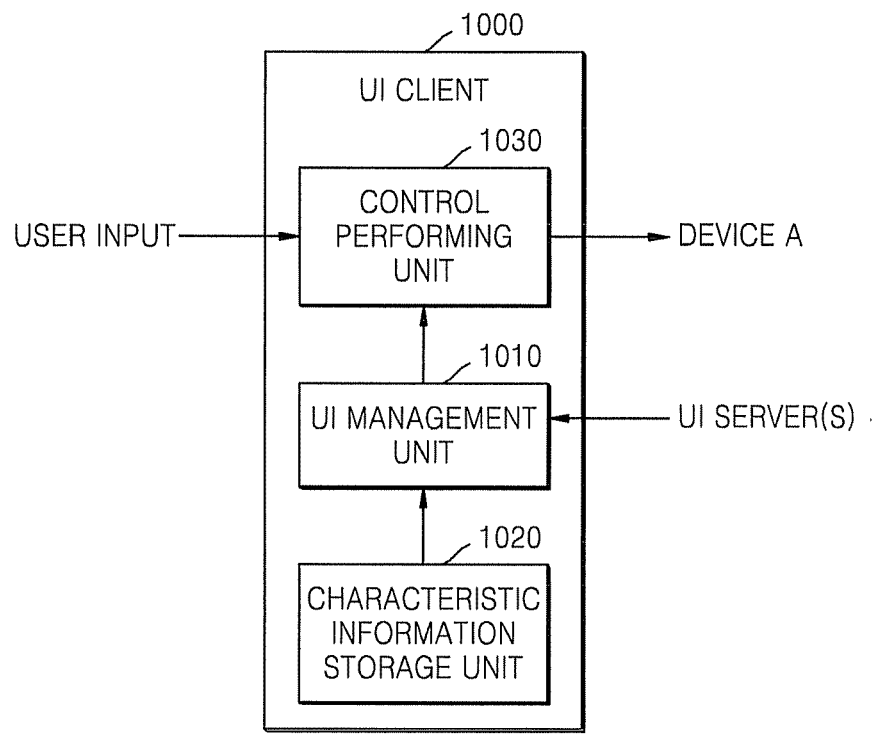
FIG. 10 illustrates a UI client according to another embodiment.

FIG. 10 illustrates a UI client 1000 according to another embodiment. Referring to FIG. 10, the UI client 1000 according to the present embodiment includes a UI management unit 1010 The UI management unit 1010 receives a UI for control of the device A from at least one UI server and manages the received UI. When the UI for control of the device A is received from two or more UI servers, a new UI for control of the device A is generated by combining the UIs received from the UI servers.

When a new UI is generated by combining two or more UIs, a UI may be dynamically generated in consideration of the performance of the UI client 1000, the network environment, and the user preference stored in the characteristic information storage unit 1020, for example.

The control performing unit 1030 controls the device A using the UI generated by the UI management unit 1010. The UI generated by the UI management unit 1010 is displayed to a user. The user input according to the displayed UI is received and a control signal to control the device A is generated and transmitted to the device A.

Figure 12:
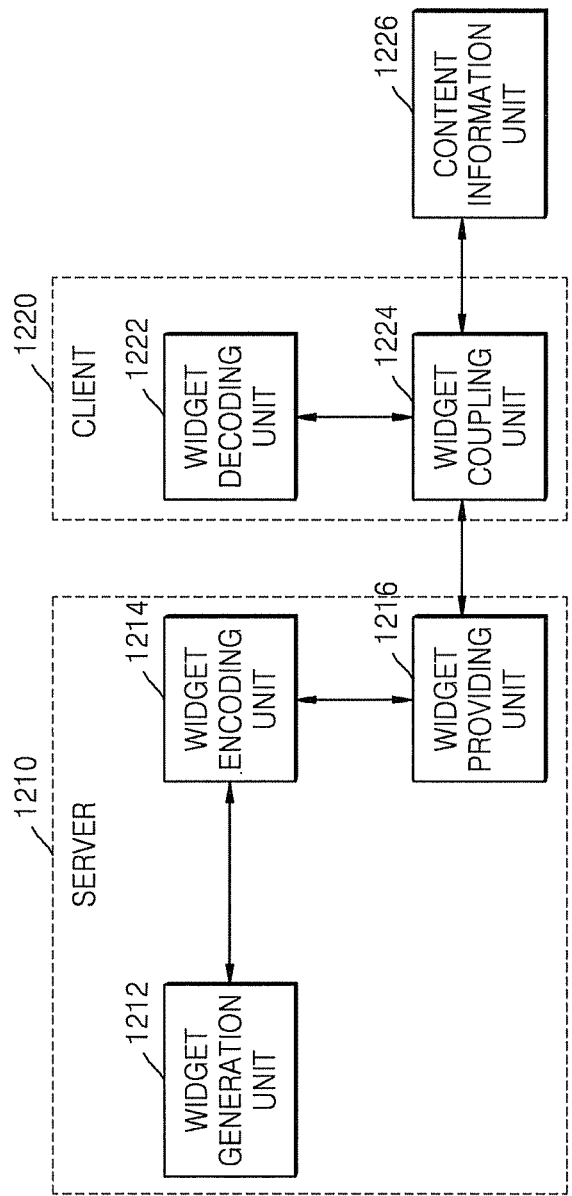
FIG. 12 illustrates a system for providing/receiving a UI according to an embodiment.

FIG. 11 is discussed previous to the discussion of FIG. 10 and subsequent to the discussion of FIG. 12.

FIG. 12 illustrates a system for providing/receiving a UI according to an embodiment. Referring to FIG. 12, a system for providing/receiving a UI includes a UI server 1210 and a UI client 1220. Although in FIG. 12 the UI is a widget, the system of FIG. 12 may be applied to other UI that is not widget.

The UI server 1210 includes a widget generation unit 1212, a widget encoding unit 1214, and a widget providing unit 1216. The widget generation unit 1212 and the widget encoding unit 1214 may be independent devices unlike those shown in FIG. 12. The widget generation unit 1212 generates a widget provided to the UI client 1220. That is, the widget generation unit 1212 authors a widget including various media such as video, audio, and text.

The widget encoding unit 1214 encodes a widget generated by the widget generation unit 1212, that is, encodes the widget in a predetermined multimedia data format in relation to FIGS. 2 and 3. Here, a scene technology using an object-based multimedia encoding method such as MPEG-4 BIFS and LASeR, for example, may be used.

Information on a protocol related to a control message transceived when a control operation is performed based on the widget is encoded together. When the UI client 1220 generates a predetermined event based on the widget, the UI server 1210 performs a predetermined control operation related to the event. That is, the UI client 1220 transmits a predetermined control message to the UI server 1210. The widget encoding unit 1214 encodes together the information on the protocol used for generating a control message and transmits an encoded information to the UI client 1220. The widget encoding unit 1214 may encode a widget by including information on the protocol in a function field of the UI element 300.

The widget providing unit 1216 transmits multimedia data generated as a result of the encoding by the widget encoding unit 1214 to the UI client 1220. That is, the widget providing unit 1216 may transmit a UI package generated as a result of the encoding to the UI client 1220.

However, when the UI client 1220 is not able to generate the widget again based on the multimedia data generated by the widget encoding unit 1214, the widget providing unit 1216 may generate and transmit the widget again based on the multimedia data. For example, the UI client 1220 may be a device that is not capable of encoding the multimedia data encoded in a UI package format. In this case, the widget providing unit 1216 performs the function of the widget coupling unit 1224 of the UI client 1220. That is, the widget providing unit 1216 generates the widget based on the multimedia data and transmits the generated widget to the UI client 1220. By accessing a content information unit 1226 that will be described later, a widget coupled with information on a content may be generated, which will be described in detail later.

The UI server 1220 includes a widget decoding unit, a widget coupling unit 1224, and the content information unit 1226. The widget decoding unit 1222 may be an independent device different from that shown in FIG. 12. In particular, the content information unit 1226 may be an external server providing the UI client 1220 with content information provided to a user via a widget. When the widget is information to display weather information as in the example shown in FIG. 11, the content information unit 1226 may be a weather server providing the weather information to the UI client 1220.

The widget decoding unit 1222 decodes the multimedia data provided by the widget providing unit 1216. The widget decoding unit 1222 decodes the multimedia data generated by being encoded using a scene description method of MPEG. A first widget is generated as a result of the decoding. The generated first widget may be a widget that does not include information on the content provided to a user. For example, a widget may include only a frame such as layout, form, theme, or template, not the content information provided to a user via the widget.

The widget coupling unit 1224 generates a second widget based on the first widget generated as a result of the decoding by the widget decoding unit 1222 and information on the content received by the content information unit 1226. If the first widget does not include the content information as described above in relation to the widget decoding unit 1222 and the first widget already includes predetermined content information, then the second widget may be generated by replacing the already included information with the content information received from the content information unit 1226. For example, when the first widget is a widget providing information on weather and may include information on the weather of Seoul, the information may be replaced by information on weather of other domestic or foreign cities such as Busan or New York. The widget coupling unit 1224 will be described in detail with reference to FIG. 13.

The content information unit 1226 is a module providing information on a content, that is, meta data, provided to a user via a widget. The content information unit 1226 may be a DB in the UI client 1220 or a separate server existing outside the UI client 1220.

When the widget is a UI providing weather information to a user as described above, the weather information is provided to the widget coupling unit 1224 so that the widget coupling unit 1224 may generate a widget by containing the first widget and the weather information. In another example, when the widget is a UI providing information on released movies, the content information unit 1226 may provide meta data about at least one movie content to the widget coupling unit 1224.

An example of a widget coupling unit 1224 of FIG. 12 is described with reference to widget coupling unit 1300 of FIG. 13.

Figure 13:
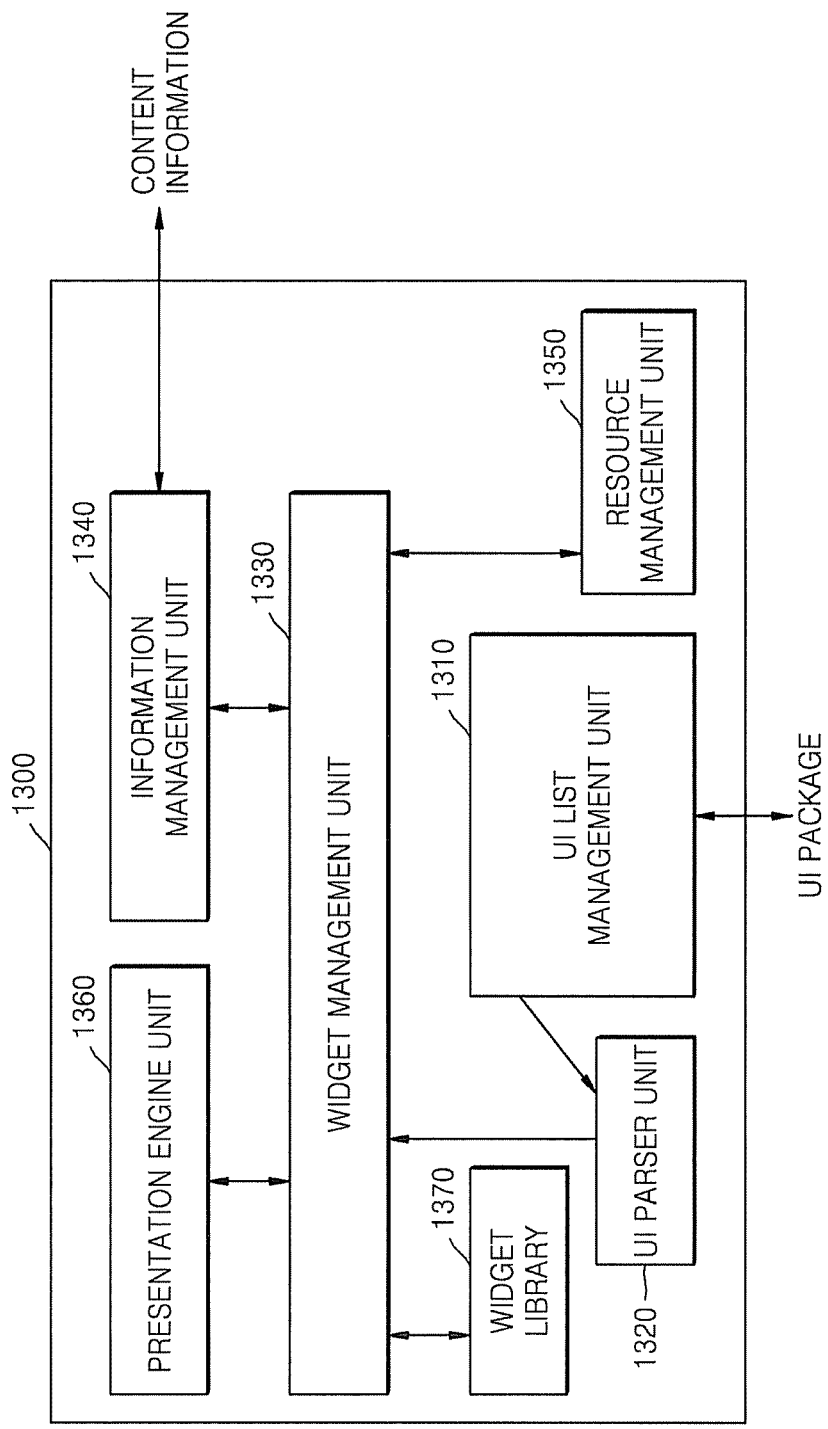
FIG. 13 illustrates a widget coupling unit according to an embodiment.

FIG. 13 illustrates a widget coupling unit 1300 according to an embodiment. In FIG. 13, a case in which the UI is a widget is described, but the system of FIG. 12 may be applied to another UI that is not a widget. Referring to FIG. 13, a widget coupling unit 1300 according to an embodiment includes a UI list management unit 1310, a UI parser unit 1320, a widget management unit 1330, an information management unit 1340, a resource management unit 1350, a presentation engine unit 1360, and a widget library unit 1370.

The UI list management unit 1310 analyzes a plurality of UI packages and creates and manages a UI list. The plurality of UI packages may be UI packages received from different UI servers. The list includes the first widget received from the UI server 1210 shown in FIG. 12. A list indicating which UI server provides which UI is managed.

The UI parser unit 1320 generates widgets by decoding the UI packages. The first widget received from the UI server 1210 is generated by the UI parser unit 1320. The generated first widget may be a widget that does not include information on a content, as described above.

The widget management unit 1330 manages widgets generated by the UI parser unit 1320. The widget may be generated by coupling information on a predetermined content to the first widget generated by the UI parser unit 1320. Information on a content may be coupled to the first widget that does not include information on a content. When the first widget includes information on a predetermined content, the information on existing content may be replaced by information on a new content received by the information management unit 1340.

When the life cycle of the second widget is already determined, the termination of the widget may be managed based on the life cycle. For example, when a user is allowed to use the second widget for only a month, the second widget may no longer be used after a month.

The information management unit 1340 provides the widget management unit 1330 with information on a content provided to a user so that the widget management unit 1330 may generate the second widget. The information on a content may be received from a server outside the UI client, as described above. The information on a content may be transmitted to an external server.

The resource management unit 1350 controls the widget management unit 1330 to manage a resource of the UI client. The generation of a widget by the widget management unit 1330 may be controlled considering the security of the UI client. Download of a particular widget may be limited considering security or hardware resource.

The presentation engine unit 1360 is an engine for presentation of a widget. The widget according to the present embodiment is encoded to a multimedia data using the scene description method of MPEG, for example. The presentation engine unit 1360 includes an engine for presenting the multimedia data. For example, a moving picture decoding engine such as an MPEG decoder, for example, may be included in the presentation engine unit 1360.

The widget library unit 1370 includes a library for dynamic generation of a widget and is a module storing the widgets that the UI client already possesses or the widgets that have been downloaded in the past. The stored widgets are provided to the widget management unit 1330 at the request of the widget management unit 1330 so that the widget management unit 1330 may dynamically generate a widget.

Figure 14:
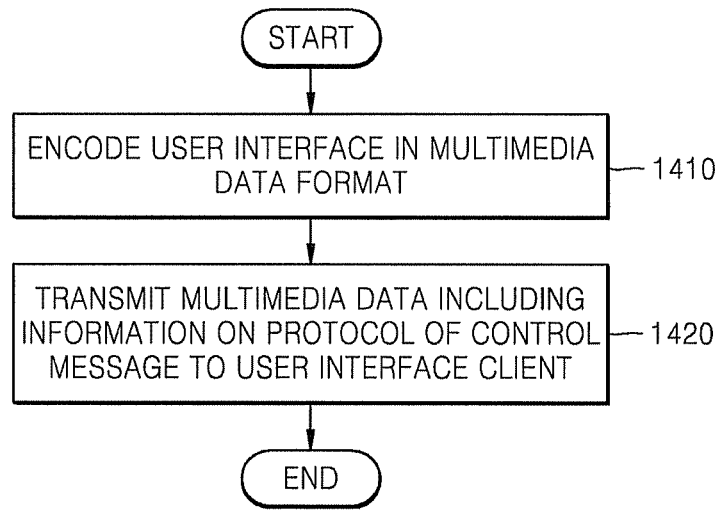
FIG. 14 is a flowchart for explaining a method of providing a UI according to another embodiment.

FIG. 14 is a flowchart for explaining a method of providing a UI according to another embodiment. Referring to FIG. 14, in operation 1410, the UI server encodes a UI in a multimedia data format, that is, in the above-described UI package format as shown in FIGS. 2 and 3 using the MPEG scene description method. The protocol information related to a control message transceived during the control operation according to the UI is encoded by being included in the UI package. The encoded UI may be a first UI that does not include information on a content. In operation 1420, the UI server transmits the multimedia data including the protocol information related to the above-described control message, that is, the UI package, to the UI client.

Figure 15:
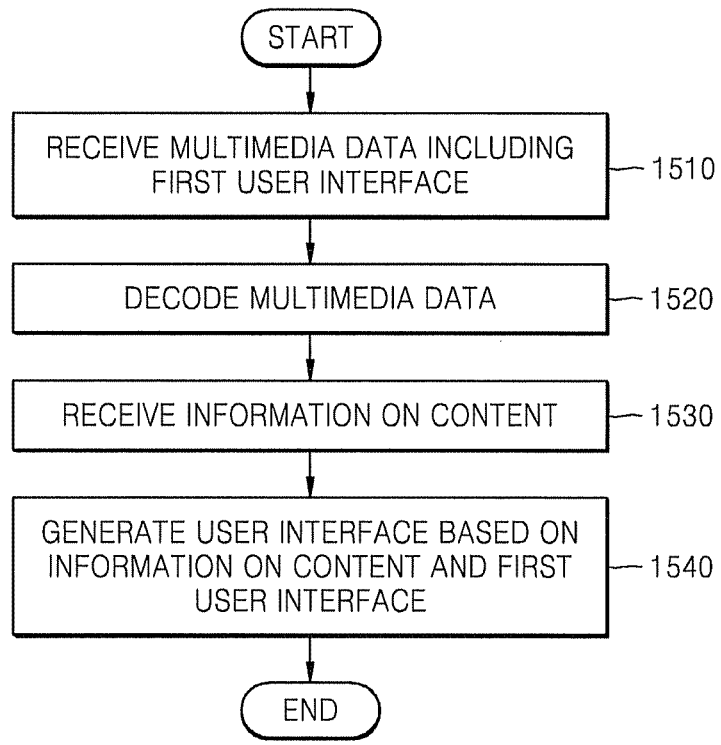
FIG. 15 is a flowchart for explaining a method of receiving a UI according to another embodiment.

FIG. 15 is a flowchart for explaining a method of receiving a UI according to another embodiment. Referring to FIG. 15, in operation 1510, the UI client receives the multimedia data including the first UI that is encoded in a multimedia data format. The first UI may be a UI that does not include the content information provided to a user via a widget and includes only a frame of the widget, such as, layout, form, theme, or template, or a combination or sub-combination thereof.

In operation 1520, the UI client decodes the multimedia data received in operation 1510. The first UI is generated by parsing and analyzing the UI package. In operation 1530, the UI client receives the content information provided to a user via a UI from an external server. In operation 1540, the UI client generates a second UI by coupling the first UI generated as a result of the decoding in operation 1520 and the content information received in operation 1530.

As described above, according to the one or more of the above embodiments, a basic component and an extended component of a component scene constituting a reproduction scene may be presented through the classification of data forming a UI and the respective constituent elements may exchange information each other through the objects thereof.

In addition, other embodiments can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded on a medium in a variety of ways, with examples of the medium including recording media, such as magnetic storage media (e.g., ROM, floppy disks, hard disks, etc.) and optical recording media (e.g., CD-ROMs, or DVDs). Thus, the medium may be such a defined and measurable structure including or carrying a signal or information, such as a device carrying a bit stream, for example, according to one or more embodiments. The media may also be a distributed network, so that the computer readable code is stored and executed in a distributed fashion. Still further, as only an example, the processing element could include a processor or a computer processor, and processing elements may be distributed and/or included in a single device.

It should be understood that the exemplary embodiments describing therein should be considered in a descriptive sense only and not for purposes of limitation. Descriptions of features or aspects within each embodiment should typically be considered as available for other similar features or aspects in other embodiments.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of providing a user interface to a plurality of user interface clients from a user interface server, the method comprising:
   encoding information on a plurality of user interface scenes in a multimedia data format;
   forming a package comprising the encoded plurality of user interface scenes; and
   transmitting the package to one or more user interface clients of the plurality of user interface clients,
   wherein at least one of the user interface scenes from the package include information about capabilities corresponding to at least one of the clients,
   wherein the package further comprises event information on events generated by objects included in a user interface scene, and wherein the event information comprises information on mapping between the events and device API (application programming interface) to process the events.

2. The method of claim 1, wherein encoding the information in the multimedia data format uses a scene description method of MPEG.

3. The method of claim 2, wherein the encoding information on a plurality of user interface scenes comprises encoding the information on the at least one of the user interface scenes to display a user interface according to the at least one of the user interface clients.

4. The method of claim 2, wherein encoding the information on the plurality of user interface scenes further comprises:
   encoding presentation information to present the objects included in the user interface scene in a scene; and
   encoding function information on functions called to process the events.

5. The method of claim 4, wherein encoding the presentation information comprises encoding at least one or more of: information on description of a structure of the scene, information on description of a method of presenting the objects, or information needed to dynamically configure the scene.

6. The method of claim 5, wherein encoding the information on description of a structure of the scene comprises encoding at least one or more of layout, form, template, positions of the objects, or presentation time of each object forming the scene.

7. The method of claim 5, wherein encoding the information on description of a method of presenting the objects comprises encoding at least one or more of type of media or a presentation method of the media to present each of the objects.

8. The method of claim 5, wherein encoding the information to dynamically configure the scene comprises encoding at least one or more of hardware source of the user interface client, preference, or network environment.

9. The method of claim 4, wherein encoding the event information further comprises encoding at least one or more of information on description of events generated by the objects and information on description of a method of processing the events.

10. The method of claim 4, wherein encoding the function information comprises encoding at least one or more of information on description of operations of device APIs to process the events or information on calling of the device APIs to process the events.

11. The method of claim 2, further comprising receiving a control signal transmitted by at least one of the plurality of user interface clients based on the transmitted multimedia data and performing a control operation according to the received control signal.

12. A non-transitory computer readable recording medium recording a program controlling a computer for executing the method of claim 1.

13. The method of claim 1, wherein the transmitting the package comprises sequentially transmitting a plurality of user interface elements.

14. A method of receiving a user interface from a user interface server in a user interface client, the method comprising:
   receiving a package comprising a plurality of user interface scenes encoded in a multimedia data format and decoding the multimedia data; and
   displaying the plurality of user interface scenes by reproducing the decoded multimedia data,
   wherein at least one of the user interface scenes from the package include information about capabilities of at least one of the user interface clients,
   wherein the package further comprises event information on events generated by objects included in a user interface scene, and wherein the event information comprises information on mapping between the events and device API (application programming interface) to process the events.

15. The method of claim 14, wherein the plurality of user interface scenes encoded in a multimedia data format are encoded using a scene description method of MPEG.

16. The method of claim 15, wherein information on the encoded plurality of user interface scenes comprises information to display a user interface according to the at least one of the user interface clients.

17. The method of claim 15, wherein information on the encoded plurality of user interface scene further comprises:
   presentation information to present the objects included in the user interface scene in a scene; and
   function information on functions called to process the events.

18. The method of claim 17, wherein the presentation information comprises at least one or more of information on description of a structure of the scene, information on description of a method of presenting the objects, or information needed to dynamically configure the scene.

19. The method of claim 18, wherein the information on description of a structure of the scene comprises at least one or more of layout, form, template, positions of the objects, or presentation time of each object forming the scene.

20. The method of claim 18, wherein the information on description of a method of presenting the objects comprises at least one or more of type of media or a presentation method of the media to present each of the objects.

21. The method of claim 18, wherein the information to dynamically configure the scene comprises at least one or more of hardware source of the user interface client, preference, or network environment.

22. The method of claim 18, further comprising:
displaying one of the plurality of user interface scenes based on the information needed to dynamically configure the scene; and
transmitting a predetermined control signal to the user interface server according to the selection of a user based on the displayed user interface.

23. The method of claim 17, wherein the event information comprises at least one or more of information on description of events generated by the objects and information on description of a method of processing the events.

24. The method of claim 17, wherein the function information comprises at least one or more of information on description of operations of device APIs to process the events or information on calling of the device APIs to process the events.

25. A non-transitory computer readable recording medium recording a program controlling a computer for executing the method of claim 14.

26. The method of claim 14, wherein the receiving the package comprises sequentially receiving a plurality of user interface elements.

27. A user interface server for providing a user interface to a plurality of user interface clients, the user interface server comprising:
an encoding unit to form a package comprising a plurality of user interface scenes and to encode information on the plurality of user interface scenes in a multimedia data format using at least one processor; and
a transmission unit to transmit the multimedia data to one or more user interface clients of the plurality of user interface clients,
wherein at least one of the user interface scenes from the package include information about capabilities of at least one of the user interface clients,
wherein the package further comprises event information on events generated by objects included in a user interface scene, and wherein the event information comprises information on mapping between the events and device API (application programming interface) to process the events.

28. The user interface server of claim 27, wherein the multimedia data format comprises a scene description method of MPEG.

29. The user interface server of claim 28, wherein the information on at least one of the plurality of user interface scenes is to display a user interface according to the at least one of the user interface clients.

30. The user interface server of claim 27, further comprising a control performing unit to receive a control signal transmitted by the user interface client based on the transmitted multimedia data and to perform a control operation according to the received control signal.

31. The user interface server of claim 27, wherein the transmission unit sequentially transmits a plurality of user interface elements.

32. A user interface client for receiving a user interface from a user interface server, the user interface client comprising:
a decoding unit to receive a package comprising a plurality of user interface scenes encoded in a multimedia data format and to decode the multimedia data using at least one processor; and
a reproduction unit to display the plurality of user interface scenes by reproducing the decoded multimedia data,
wherein at least one of the user interface scenes from the package include information about capabilities of one or more user interface clients,
wherein the package further comprises event information on events generated by objects included in a user interface scene, and wherein the event information comprises information on mapping between the events and device API (application programming interface) to process the events.

33. The user interface client of claim 32, wherein the format of the multimedia data is a multimedia data format comprising a scene description method of MPEG.

34. The user interface client of claim 33, wherein the encoded information on the at least one of the plurality of user interface scenes is to display a user interface according to the at least one of the user interface clients.

35. The user interface client of claim 32, wherein the decoding unit sequentially receives a plurality of user interface elements.

36. The user interface client of claim 32, wherein the user interface client selects a scene from the plurality of user interface scenes included in the package which corresponds to the capabilities of the user interface client, and displays the selected user interface scene.

37. The user interface client of claim 32, further comprising a control performing unit to display one of the plurality of user interface scenes based on information to dynamically configure the user interface scene and to transmit a predetermined control signal to the user interface server according to the selection of a user based on the displayed user interface.

38. A method of providing a user interface to a user interface client from a user interface server, the method comprising:
encoding a plurality of user interface scenes in a multimedia data format;
forming a package comprising the encoded plurality of user interface scenes; and
transmitting the package to the user interface client,
wherein the multimedia data includes information on a protocol of a control message transmitted to the user interface server when the user interface client performs a control operation according to the user interface,
wherein least one of the user interface scenes from the package include information about capabilities of at least one of the user interface clients,
wherein the package further comprises event information on events generated by objects included in a user interface scene, and wherein the event information comprises information on mapping between the events and device API (application programming interface) to process the events.

39. The method of claim 38, wherein the multimedia data format comprises a scene description method of MPEG.

40. The method of claim 39, wherein the user interface is a widget.

41. A non-transitory computer readable recording medium recording a program controlling a computer for executing the method of claim 38.

42. The method of claim 38, wherein the transmitting the package comprises sequentially transmitting a plurality of user interface elements.

43. A method of receiving a user interface from a user interface server in a user interface client, the method comprising:
receiving a package comprising a plurality of user interface scenes encoded in a multimedia data format, and decoding the multimedia data;
receiving information on a content provided to a user via the plurality of user interface scenes;
generating a first user interface from at least one of the plurality of user interface scenes received in the package; and
generating a second user interface by coupling the first user interface and the information on the content,
wherein at least one of the user interface scenes from the package include information about capabilities of at least one of the user interface clients,
wherein the package further comprises event information on events generated by objects included in a user interface scene, and wherein the event information comprises information on mapping between the events and device API (application programming interface) to process the events.

44. The method of claim 43, wherein the format of the multimedia data is a multimedia data format comprising a scene description method of MPEG.

45. The method of claim 44, wherein the first and second user interfaces are widgets.

46. A non-transitory computer readable recording medium recording a program controlling a computer for executing the method of claim 43.

47. The method of claim 43, wherein the receiving the package comprises sequentially receiving a plurality of user interface elements.

48. A user interface server providing a user interface to a user interface client, the user interface server comprising:
a user interface generation unit to generate the user interface using at least one processor;
a user interface encoding unit to encode a plurality of user interface scenes in a multimedia data format and to form a package comprising the encoded plurality of user interface scenes; and
a user interface providing unit to transmit the package to the user interface client,
wherein the multimedia data includes information on a protocol of a control message transmitted to the user interface server when the user interface client performs a control operation according to the user interface,
wherein at least one of the user interface scenes from the package include information about capabilities of at least one of the user interface clients,
wherein the package further comprises event information on events generated by objects included in a user interface scene, and wherein the event information comprises information on mapping between the events and device API (application programming interface) to process the events.

49. The user interface server of claim 48, wherein the multimedia data format comprises a scene description method of MPEG and the user interface is a widget.

50. The user interface server of claim 48, wherein the user interface providing unit sequentially transmits a plurality of user interface elements.

51. A user interface client receiving a user interface from a user interface server, the user interface client comprising:
a user interface decoding unit to receive a plurality of packages comprising a plurality of user interface scenes encoded in a multimedia data format, and to decode the plurality of packages, using at least one processor, wherein a first user interface is generated as a result of the decoding; and
a user interface coupling unit to generate a second user interface by coupling the first user interface and information on a content provided to a user,
wherein at least one of the user interface scenes from at least one package include information about capabilities of at least one of the user interface clients,
wherein at least one package further comprises event information on events generated by objects included in a user interface scene, and wherein the event information comprises information on mapping between the events and device API (application programming interface) to process the events.

52. The user interface client of claim 51, wherein the multimedia data format is obtained by using a scene description method of MPEG and the first and second user interfaces are widgets.

53. The user interface client of claim 51, wherein the user interface decoding unit sequentially receives a plurality of user interface elements.

* * * * *

UNITED STATES PATENT AND TRADEMARK OFFICE
CERTIFICATE OF CORRECTION

| | | |
|---|---|---|
| PATENT NO. | : 9,084,020 B2 | Page 1 of 1 |
| APPLICATION NO. | : 12/423992 | |
| DATED | : July 14, 2015 | |
| INVENTOR(S) | : Kyung-mo Park et al. | |

It is certified that error appears in the above-identified patent and that said Letters Patent is hereby corrected as shown below:

In the claims

Claim 38, Column 18, Line 55

Delete "wherein least" and insert --wherein at least--, therefor.

Signed and Sealed this
Thirteenth Day of October, 2015

Michelle K. Lee
*Director of the United States Patent and Trademark Office*